United States Patent
Fuerst (10) Patent No.: US 8,140,594 B2
(45) Date of Patent: *Mar. 20, 2012

(54) ADVANCED MESSAGE MAPPING WITH SUB-OBJECT KEY MAPPING

(75) Inventor: Karl Fuerst, Walldorf (DE)

(73) Assignee: SAP AG, Walldorf (DE)

( * ) Notice: Subject to any disclaimer, the term of this patent is extended or adjusted under 35 U.S.C. 154(b) by 1351 days.

This patent is subject to a terminal disclaimer.

(21) Appl. No.: 10/943,137

(22) Filed: Sep. 17, 2004

(65) Prior Publication Data
US 2006/0064465 A1 Mar. 23, 2006

(51) Int. Cl.
*G06F 17/30* (2006.01)
(52) U.S. Cl. .................. 707/809; 707/602
(58) Field of Classification Search ............ 707/602, 707/809
See application file for complete search history.

(56) References Cited

U.S. PATENT DOCUMENTS

| | | | |
|---|---|---|---|
| 5,862,325 A * | 1/1999 | Reed et al. | 709/201 |
| 5,920,725 A * | 7/1999 | Ma et al. | 717/171 |
| 6,073,140 A * | 6/2000 | Morgan et al. | 707/203 |
| 6,253,213 B1 | 6/2001 | Vanderschaaf | |
| 6,785,689 B1 * | 8/2004 | Daniel et al. | 707/754 |
| 6,845,378 B1 * | 1/2005 | Pauly et al. | 707/101 |
| 7,035,877 B2 * | 4/2006 | Markham et al. | 707/200 |
| 7,236,973 B2 * | 6/2007 | Kalthoff et al. | 707/6 |
| 2002/0033844 A1 * | 3/2002 | Levy et al. | 345/744 |
| 2002/0095454 A1 * | 7/2002 | Reed et al. | 709/201 |
| 2002/0156761 A1 | 10/2002 | Chen et al. | |
| 2002/0165961 A1 * | 11/2002 | Everdell et al. | 709/225 |
| 2003/0023471 A1 | 1/2003 | Kettler et al. | |
| 2003/0093307 A1 * | 5/2003 | Renz et al. | 705/7 |
| 2003/0115336 A1 | 6/2003 | Auerbach et al. | |
| 2003/0126464 A1 * | 7/2003 | McDaniel et al. | 713/201 |
| 2003/0158795 A1 * | 8/2003 | Markham et al. | 705/28 |
| 2003/0212654 A1 * | 11/2003 | Harper et al. | 707/1 |
| 2003/0212690 A1 * | 11/2003 | Surma et al. | 707/100 |
| 2003/0215112 A1 * | 11/2003 | Rhoads et al. | 382/100 |
| 2003/0217176 A1 * | 11/2003 | Beunings | 709/238 |
| 2003/0236791 A1 * | 12/2003 | Wilmsen et al. | 707/100 |

(Continued)

FOREIGN PATENT DOCUMENTS
EP 1 043 671 10/2000
(Continued)

OTHER PUBLICATIONS
Knolmayer et al., "Supply chain Management Based on SAP Systems: Order Management in Manufacturing Companies R/3 4.6 APO 3.0", Jan. 10, 2002, Springer-Verlag, p. 85, 116-146.*

(Continued)

*Primary Examiner* — Khanh Pham
(74) *Attorney, Agent, or Firm* — Schwegman, Lundberg & Woessner, P.A.

(57) ABSTRACT

A method of sharing data includes storing a central data object in the central computer system, the data object including an attribute and a plurality of values for the attribute and creating a first mapping between the values of the attribute stored in the central data object and values of an attribute for a first client data object stored in a client computer system. The first mapping is stored, and the first mapping is used to selectively extract first data from the central data object for distribution to the first client data object. The extracted data is distributed from the central computer system to one or more client systems.

15 Claims, 9 Drawing Sheets

U.S. PATENT DOCUMENTS

| | | | |
|---|---|---|---|
| 2004/0031030 A1* | 2/2004 | Kidder et al. | 717/172 |
| 2004/0039681 A1* | 2/2004 | Cullen et al. | 705/37 |
| 2004/0039727 A1 | 2/2004 | Dessloch et al. | |
| 2004/0044689 A1* | 3/2004 | Krabel et al. | 707/104.1 |
| 2004/0103182 A1* | 5/2004 | Krabel et al. | 709/223 |
| 2004/0117358 A1* | 6/2004 | von Kaenel et al. | 707/3 |
| 2004/0117428 A1* | 6/2004 | Surma et al. | 709/200 |
| 2004/0128353 A1* | 7/2004 | Goodman et al. | 709/204 |
| 2004/0177319 A1* | 9/2004 | Horn | 715/501.1 |
| 2006/0080338 A1* | 4/2006 | Seubert et al. | 707/100 |
| 2006/0085336 A1* | 4/2006 | Seubert et al. | 705/40 |
| 2006/0095331 A1* | 5/2006 | O'Malley et al. | 705/22 |
| 2006/0101096 A1 | 5/2006 | Fuerst | |
| 2007/0156677 A1* | 7/2007 | Szabo | 707/5 |

FOREIGN PATENT DOCUMENTS

| | | | |
|---|---|---|---|
| EP | 1638019 A2 * | 3/2006 | |
| WO | WO0122270 * | 3/2001 | |
| WO | WO 01/27806 | 4/2001 | |
| WO | WO 2004023335 A2 * | 3/2004 | |
| WO | WO 2004023338 A2 * | 3/2004 | |
| WO | WO-2004057478 A2 | 7/2004 | |

OTHER PUBLICATIONS

Knolmayer et al., "Supply Chain Management Based on SAP Systems: Order Management in Manufacturing Companies", Dec. 2002, Springer-Verlag, p. V-VII, 18-22, 117-119.*

Krabel et al., U.S. Appl. No. 60/408,130, filed Sep. 3, 2002.*

Krabel et al., U.S. Appl. No. 10/367,103, filed Feb. 13, 2003.*

Mora et al, "Data Mapping Diagrams for Data Warehouse Design with UML", Aug. 11, 2004, University of Alicante (Spain), p. 1-14, <Retrieved from the web Aug. 7, 2008>.*

Huston et al, "Partially Connected Operation", Apr. 1995, Second USENIX Symposium on Mobile and Location-Independent Computing, p. 1-8, <Retrieved from internet Jan. 19, 2009>.*

Gray et al, "The Dangers of Replication and a Solution", Jun. 1996, ACM SIGMOD International Conference on Management of Data, p. 173-182, <Retrieved from internet Jan. 19, 2009>.*

Huston et al, "Disconnected Operation for AFS", Jun. 1993, CITI Technical Report 93-3, University of Michigan, Ann Arbor, p. 1-9.*

Keller et al, "The WSLA Framework: Specifying and Monitoring Service Level Agreements for Web Services", Mar. 2003, Journal of Network and Systems Management, vol. 11, Iss. 1, 25 pages, <Retrieved from Springer Jul.4, 2009>.*

Springer, Optical Networks Magazine, vol. 2, No. 1, 99 pages, <Retrieved from Springer Jul. 4, 2009>.*

Hsu et al, "A Multimedia Authoring-in-the-Large Environment to Support Complex Product Documentation", Jan. 1999, Multimedia Tools and Applications, 54 pages, <Retrieved from Springer Jul. 4, 2009>.*

Anerousis, "An Architecture for Building Scalable, Web-Based Management Services", Mar. 1999, Journal of Network and Systems Management, p. 73-104, <Retrieved from internet Jul. 2, 2009>.*

Tran et al, "ZIGZAG an efficient peer to peer scheme for media streaming", Mar. 2003, INFOCOM 2003, p. 1283-1292, <Retrieved from IEEE Explore May 15, 2009>.*

Dogan et al, "Personalised multimedia services for real-time video over 3G mobile networks", May 2002, Mobile 3G Conference, p. 366-370, <Retrieved from IEEE Explore May 15, 2009>.*

O'Neill et al, "The portable UNIX programming system (PUPS) and CANTOR: a computational environment for dynamical representation and analysis of complex neurogical data", p. 1259-1276, <Retrieved from JSTOR May 15, 2009>.*

Hufnagel et al, "Perceived Chargeback System Fairness in Decentralized Organizations: An Examination of the Issues", Dec. 1989, MIS Quarterly, vol. 13, No. 4, p. 415-430, <Retrieved from JSTOR May 15, 2009>.*

Oki et al., "The Information Bus—An Architecture for Extensible Distributed Systems," *Operating Systems Review*, ACM, New York, NY, 1993, 27(5); 58-68.

"U.S. Appl. No. 10/975,490, Non-Final Office Action mailed Mar. 9, 2007", 12 pgs.

"U.S. Appl. No. 10/975,490, Response filed Jun. 7, 2007 to Non-Final Office Action mailed Mar. 9, 2007", 15 pgs.

"U.S. Appl. No. 10/975,490 Notice of Allowance mailed Aug. 23, 2007", NOAR,6 pgs.

"International Search Report for EP Patent Application No. 05020213.4-1527", 7 pgs.

Chengkau, et al., "Object Mapping for Layered Cooperative Systems", *IEEE 1999*,67-76.

Strom, et al., "Concurrency Control and View Notification Algorithms for Collaborative Replicated Objects", *IEEE 1997*,194-203.

\* cited by examiner

ADVANCED MESSAGE MAPPING WITH SUB-OBJECT KEY MAPPING

TECHNICAL FIELD

This disclosure relates to managing different representations of information used by different data processing systems and, more particularly, to advanced message mapping with sub-object key mapping.

BACKGROUND

Information technology ("IT") environments can consist of many different systems performing processes, such as business processes, on common master data. The different systems can be part of the same entity or can be part of different entities, such as vendors or contractors. The master data used for the processes can be stored in a number of different locations, systems, and/or incompatible formats. Branch offices of a company can work largely independently, adopted companies can introduce new software solutions to a group of affiliated companies, and systems from different vendors can be linked. Different master data models can make it difficult to integrate business processes in these scenarios.

Information, such as instructions for performing tasks and descriptions of the characteristics of items and people, can be stored in machine-readable representations by data processing devices. Different data processing systems often represent the same or similar information differently. For example, different schemes for organizing, associating, storing, processing, or encoding information can be used by different data processing systems. Discrepancies in the way information is represented often hinder or prevent different data processing devices from collaborating effectively.

SUMMARY

In a first general aspect, a method of sharing data includes storing a central data object in the central computer system, the data object including an attribute and a plurality of values for the attribute and creating a first mapping between the values of the attribute stored in the central data object and values of an attribute for a first client data object stored in a client computer system. The first mapping is stored, and the first mapping is used to selectively extract first data from the central data object for distribution to the first client data object. The extracted data is distributed from the central computer system to one or more client systems.

Implementations may include one or more of the following features. For example, the first mapping may designate a direct correspondence between a value stored in the central data object and a value stored in the first client data object. The first mapping may designate a correspondence between central metadata referring to a value stored in the central data object and client metadata referring to a value stored in the first client data object. Central metadata for a central data object may be organized according to a business semantics used for organizing data in the central data object. First metadata may refer at different times to different values stored in the central data object. A validity value may determine the value stored in the central data object to which the first metadata refers. The attribute can be an address. Creating a mapping may include receiving a designation from a user input through a graphical user interface specifying a relationship between the values of the attribute stored in the central data object and values of the attribute for the first client data object stored in the client computer system.

An implementation can further include creating a second mapping between the values of the attribute stored in the central data object and values of an attribute for a second client data objects stored in a client computer system and storing the second mapping. The second mapping can be used to selectively extract second data from the central data object for distribution to the second client data object, and the extracted second data can be distributed from the central computer system to one or more client systems. The extracted first data and the extracted second data may be distributed at substantially the same time. At least a portion of the first data may be different from the second data.

In anther general aspect, a system for sharing data includes one or more client systems and a central module of an entity including a central data store adapted for storing a central data object. The central data object includes an attribute and a plurality of values for the attribute, and is adapted for storing a first mapping between the values of the attribute stored in the central data object and values of an attribute for a first client data object stored one of the client computer system. The first mapping can be used to selectively extract first data from the central data object for distribution to a first client data object.

Implementations may include one or more of the following features. The first mapping may designate a direct correspondence between a value stored in the central data object and a value stored in the first client data object. The first mapping may designate a correspondence between first metadata referring to a value stored in the central data object and second metadata referring to a value stored in the first client data object. Central metadata for a central data object may be organized according to a business semantics used for organizing data in the central data object. The first metadata may refer at different times to different values stored in the central data object. A validity value may determine the value stored in the central data object to which the first metadata refers. The attribute may be an address. The central data store may be additionally adapted for storing a second mapping between the values of the attribute stored in the central data object and values of an attribute for a second client data object stored in a client computer system and may be adapted for storing the second mapping in the central computer system that can be used to selectively extract second data from the central data object for distribution to the second client data object.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1A:
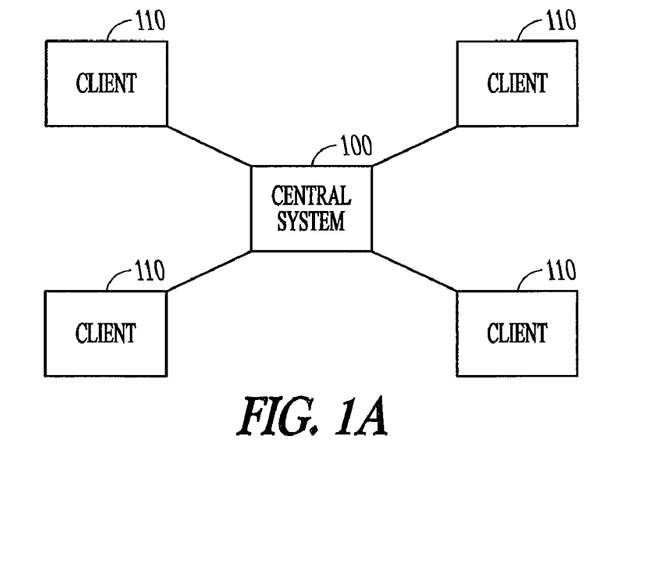
FIGS. 1A and 1B are block diagrams illustrating a collaborative master data management system.

As shown in FIG. 1A, a collaborative master data management ("cMDM") system includes a central module 100 and one or more client modules 110. Each client module 110 is linked directly to the central module 100.

The central module 100 can include a central system representing a centralized control of data management for an entity, such as a business or an organization. The client modules 110 can include systems or groups performing processes on master data. For example, the client modules 110 can include systems and/or groups involved in a product creation process. In this example, the client modules 110 can include a legacy module, an e-procurement module, an e-sales module, a sourcing module, a collaborative engineering module, a manufacturing module, and enterprise resource planning ("ERP") modules.

The master data can be stored in the client module 110, in the central module 100, or in both, depending on the implementation. The central module 100 allows the master data used by each client 110 to include master data that is shared by all clients 110. Traditionally, client modules 110 would communicate directly with each other in a point-to-point architecture. For example, a manufacturing module might need to share master data with an e-procurement module, an e-sales module, and a collaborative engineering module, among others. In traditional systems, the manufacturing module would receive data from or transmit data to the appropriate module, which could lead to inconsistency in data or the use of obsolete data, if data is not updated in the module transmitting the data for sharing. In the system described with reference to FIG. 1A and FIG. 1B, data are managed through the central module 100. The central module 100 ensures consistent master data, and the distribution of the master data.

Figure 1B:
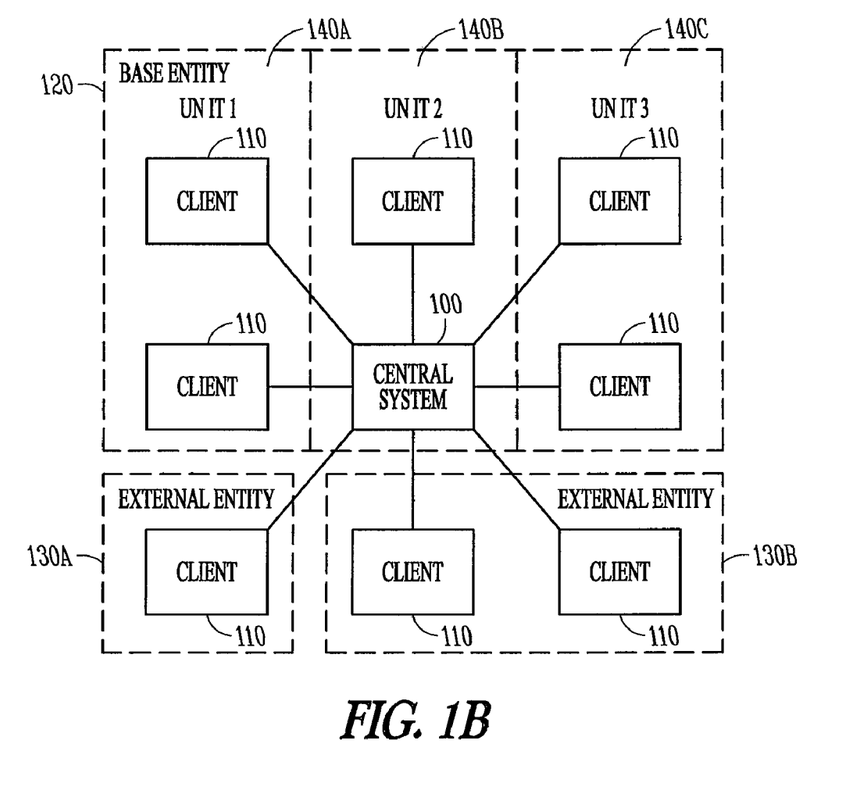

As shown in FIG. 1B, the cMDM system can be implemented to be used across a plurality of entities including 120, 130A, or 130B. The central module 100 can be part of a base entity 120. The client systems 110 can be part of the base entity 120 or part of an external entity 130A or 130B. For example, the base entity 120 can include an enterprise including client modules 110 for ERP, legacy, e-procurement, and e-sales. The base entity can be divided into units 140A, 140B, and 140C, where each unit can include one or more clients 110. The external entities 130A and 130B can include a contractor including a client 110 for manufacturing and a supplier including clients 110 for collaborative engineering and sourcing.

In another example, the base entity 120 can include a customer service entity while the external entity 130A and 130B can include an enterprise. Customer information that may normally be dispersed over multiple client modules 110 can be consolidated through central system 100.

The centrally managed master data can be used for processes such as cross-group reporting, data integration for mergers and acquisitions, reducing the diversity of parts, supporting product maintenance, simplification of customer management, and supporting catalogs, such as through merging catalog contents and bundling of purchasing activities into a smaller number of vendors. The cMDM system can also support versioning and change management. As versions are created or changes made, the data for the versions or changed data can be managed through central module 100, as described below.

A setup of a cMDM system can be performed before data is exchanged between the cMDM system and client modules 110. Identification attributes are specified for master data objects and rules for matching are established. The setup of attributes and rules for matching can be performed with regard to the entity using the cMDM system, or with regard to the object needs in general. A matching process performed on master data objects received from client modules can be used to manage the master data objects.

Specifying attributes can include matching different objects from different client applications or different client modules 110. Specifying attributes can also include linking elements of the matched structures together so that master data objects received from different client systems can be compared.

The specified attributes can also be ranked during setup. The ranking of attributes can be used during a matching process to determine whether two master data objects are identical. Thus, if an attribute that is ranked higher doesn't match between two objects, it is more likely that they are not identical or similar than if an attribute ranked lower on the list does not match.

Figure 2:
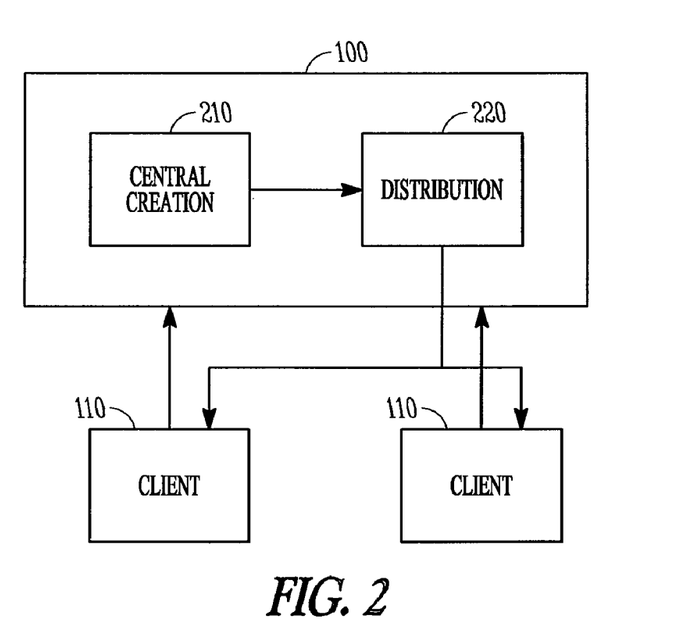
FIG. 2 is a block diagram illustrating a content consolidation implementation of a collaborative master data management system.

FIG. 2 is a block diagram illustrating a central master data management implementation of a cMDM system. In the central master data management scenario, master data is controlled completely in the central module. In this implementation, all master data information resides centrally in central module 100. This implementation can be used for applications such as a central product data pool supplying product data to multiple locations for production, assembly, sales, and distribution.

At central creation module 210, master data objects can be created. The created master data objects can include complete object information including complete object definition, object mapping information and object dependencies. The master data objects can be created in response to a request from a client module 110. Matching processes can be performed in response to the request, and mapping information can be included in the data object information stored in the central module 100. If identical objects exist in the central module 100, the requesting client module 110 can be notified that an identical object exists, and a new master data object is not created or mapped to an existing object. The mapping information can be updated.

At distribution module 220, the centrally maintained master data information can be distributed as individual objects as they are defined in the client modules 110. The objects can be distributed in packets. Objects that belong together can be changed and distributed together. If the master data includes product model master data, the objects that belong together, such as products, BOMs (bills of material), and documents, are collected together in a consistent packet and distributed together. The objects can be collected according to information requirements of the recipient client module 110. For example, the objects can be collected in reference to a particular view for a product. A view can include product relevant attributes, such as purchasing dates. Thus, a group of objects can be linked according to usage or location. For example a sales view can include attributes or content of objects that are related to or used by a sales department.

As discussed above, the scenarios can be used together. For example, central master data management can be used for central data object master data objects, where all of the central data object master data object information is maintained in central module 100. The central module 100 can store only global attributes for the rest of the data objects, such as product master data objects.

Figure 3:
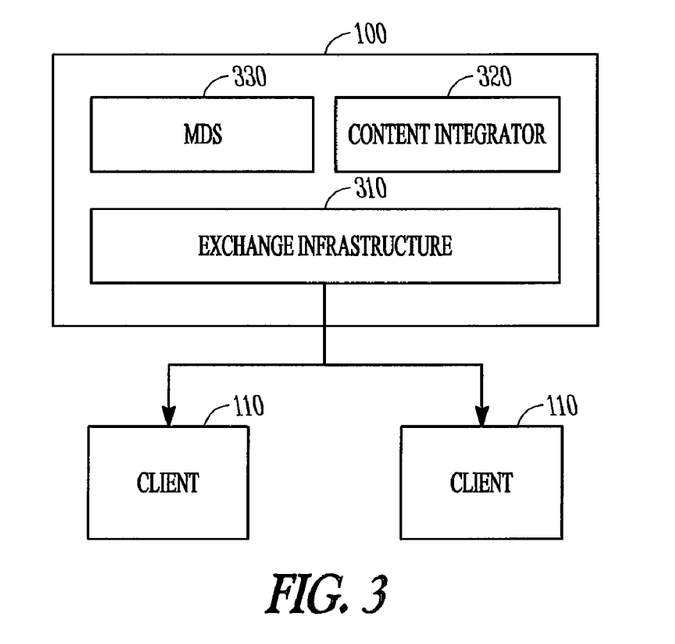
FIG. 3 is a block diagram illustrating a collaborative master data management module.

FIG. 3 is a block diagram illustrating a simplified structure of a central module 100. Central module 100 can include an exchange infrastructure ("XI") 310, a content integrator ("CI") 320, and a master data server ("MDS") 330. The XI 310 can be used for communication between client modules 110 and central module 100.

Master data that is to be distributed is received in XI 310. Distribution can be performed in three different ways, including subscription-based distribution, historic distribution, and content-based distribution. A routing model (not shown) stores information about which systems are interested in the master data. The master data is then sent from the XI 310 to the relevant systems. Queuing can be used to ensure consistent messaging across the XI 310. Messages can be sent in XML (extensible markup language) format between the systems.

CI 320 can correlate master data from different systems by defining identifying attributes for each object. The identifying attributes are fed to CI 320 from different systems in client modules 110 and scanned for analogousness according to predefined rules. The CI 320 saves an object ID for objects in the system landscape, no matter to which system they belong, or to which data model they are subject. Master data objects that are stored in client modules 110 retain the identification defined in the respective client systems storing the master data objects. CI 320 understands that the respective instantiation relates to some other object in the system (using the mapping function). Thus, CI 320 performs the matching processes and preparation of the resulting ID mappings.

In one example, mapping can be done using industry specific standards. Different industries such as Chemicals, Consumer Products ("CP")/Retail and so on, define standards of how an object should be described for their requirements. In one industry, for example, in CP it can be sufficient to describe a product name, description and a class (e.g. 'SWEETS'), while in Chemicals using only the class is insufficient. Thus, attributes and their values can be used to describe the chemicals sufficiently. Thus, the attributes can be like a language for an industry. Therefore, the mapping of a MDM standard-xml format to industry specific standards is supported. Industry specific standards include, for example, CIDEX, Pidx, RosettaNet, and Pricat.

CI 320 use the mappings for a double-checking process for creating objects. The central module 100 receives a request to create a master data object. The CI 320 checks the request for identical objects. If no match is found, the central module generates a new object. The CI 320 then performs a check for the new object. If no match is found, then the central module stores the new master data object. Thus, even if the first check is incomplete based on the description provided by the client module 110, a match may be found when the object is completely created.

Merge strategies can be used to combine two or more objects that are found to be similar or identical. For example, if a master data object for a pump is produced in a purchasing system, a sales system, and a production system, one object can be created in central module 100 by merging the three master data objects. For example, a new object can be created where different systems have authorizations for different parts of the object. Thus, a purchasing system can maintain purchasing information for the master data object. Although the purchasing system can view sales and production information, the purchasing system can be given authorization only to maintain the purchasing information.

MDS 330 can include a central data store for storing data objects. MDS 330 can perform the processes of object creation and change. MDS 330 can also provide services for change management, such as unified versioning, and status management. Grouping of changed objects into packets for distribution can also be performed in MDS 330.

Figure 4:
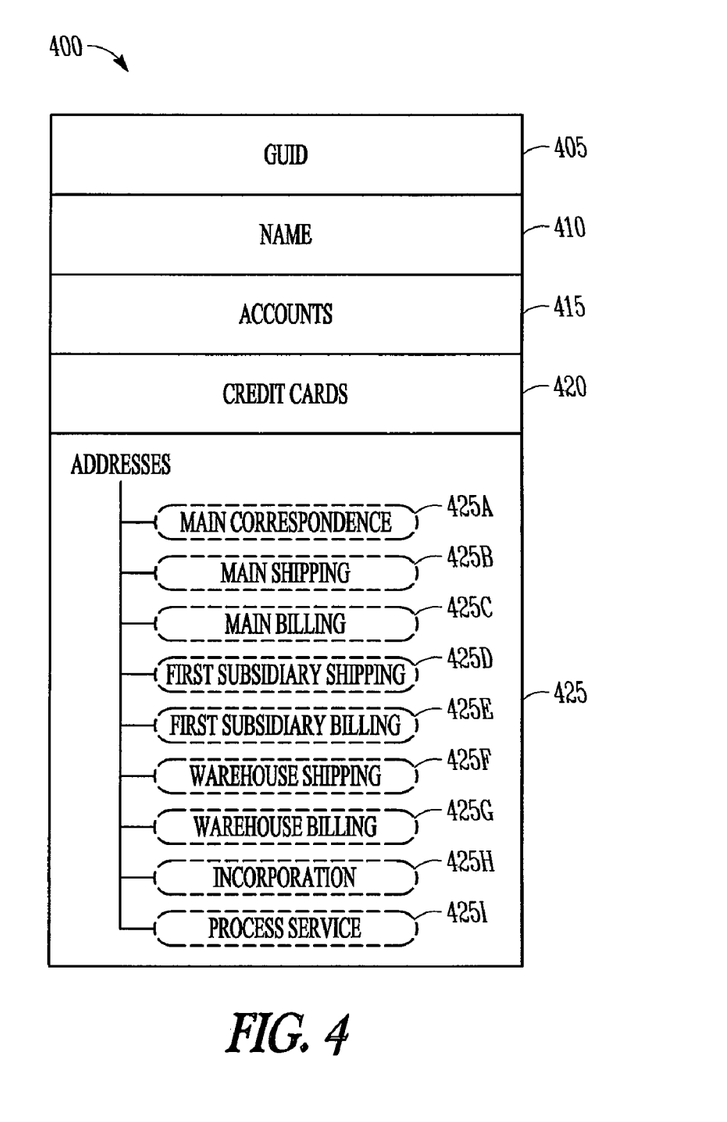
FIG. 4 is an exemplary central data object.
Figure 5A:
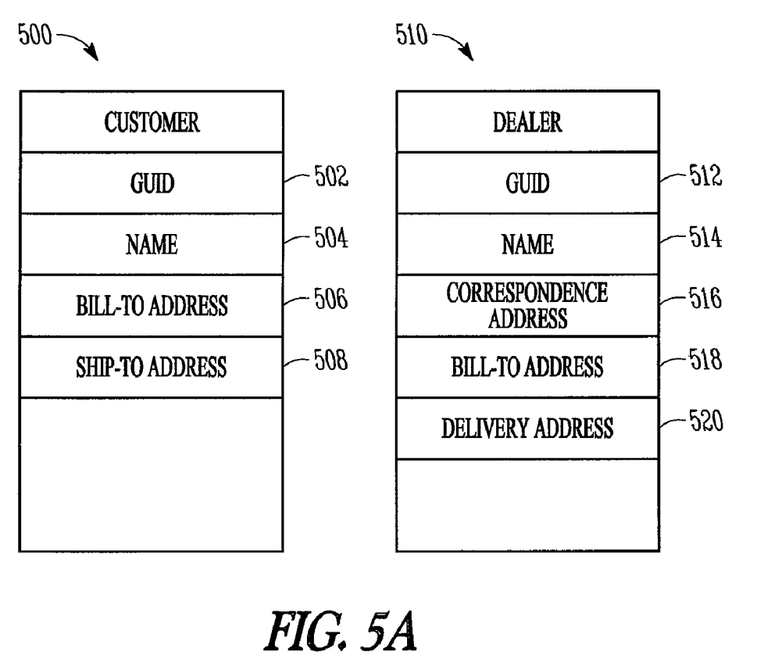
FIGS. 5A and 5B are exemplary client data objects.
Figure 5B:
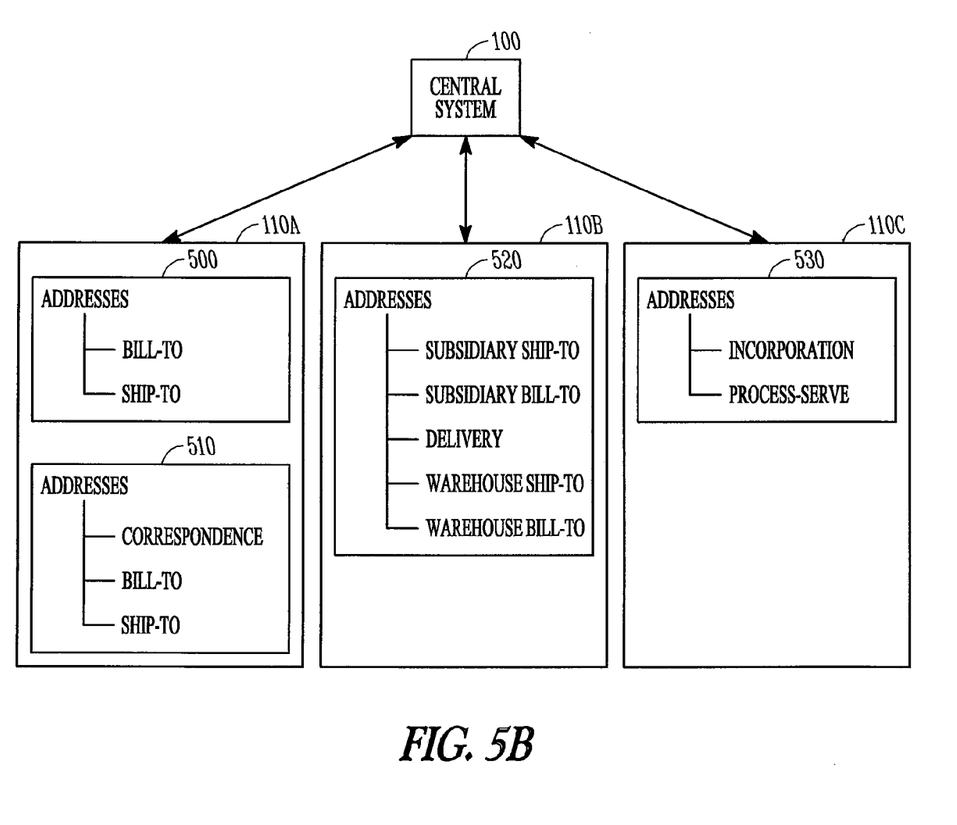

For purposes of illustration, FIGS. 4 and 5 show examples of how different data models used in different components of a system can impact the representation and integration of data in a system. In particular, FIG. 4 shows an example central data object 400 that can be an object in a computer system, such as, for example, the central module 100 of a cMDM computer system and that can describe attributes of an organization with whom a business enterprise interacts. The central data object 400 can include a globally unique identification number ("GUID") 405, which can be, for example, a 32-bit hexadecimal identification character that uniquely distinguishes the central data object 400 from all other data objects used in the cMDM system, a user-recognizable name of the central data object 410, and various data relating to the central data object. Data stored in the central data object can be grouped by different attributes that characterize a central data object. For example, the central data object can store an arbitrary number of account numbers 415 associated with various accounts of the central data object, an arbitrary number of credit card numbers 420 associated with the central data object, and an arbitrary number of addresses 425 associated with the central data object. In particular, the central data object 400 can have, for example, 9 credit card numbers 420 and 9 addresses (e.g., a main correspondence address 425*a*, a main shipping address 425*b*, a main billing address 425*c*, a first subsidiary shipping address 425*d*, a first subsidiary billing address 425*e*, a warehouse shipping address 425*f*, a warehouse billing address 425*g*, an incorporation address 425*h*, and a process service address 425*i*). Each datum can be uniquely identified by the GUID 405 of the central data object 400, the name of the attribute (e.g., address, credit card number), and the particular number of the datum stored for that attribute. For example, the main correspondence address 425*a* of the central data object 400 can be identified by the GUID 405 of the central data object, the "address" attribute, and the first data entry for the address attribute.

In addition, business semantics can be used to define meta data that refer to the data in the data object in a way that is logical to a user of the data. For example, each address can be associated with one or more address-types (e.g., "correspondence," "ship-to," "bill-to," "subsidiary-ship-to," "subsidiary-bill-to," "ware-house-ship-to," "warehouse-bill-to," "incorp.," and "process-serve"), and one address of each address-type can be chosen as the "standard address" for that address-type. Also, a user can create an "address-usage" with respect to an address-type and one of the addresses associated with the address-type. For example, if the main billing address 425*c*, the first subsidiary billing address 425*e*, and the warehouse billing address 425*g* are all associated with the "bill-to" address-type, the user can choose one of these addresses to be used when sending bills to a customer. Conditions under which a particular address will be used can be associated with either the actual address 425*a*-425*i* or with the address usage. Such conditions can be known as a "validity" because they govern when a particular address is valid for a central data object 400. For example, the main billing address 425*c* could be valid as the "bill-to" address when sending bills of over $100,000; the first subsidiary billing address 425*e* could be valid as the "bill-to" address for sending bills of $100,000 and less; and the warehouse billing address 425g could become valid as the "bill-to" address for all bills of $100,000 and less sent after a particular date (e.g., the opening date of the warehouse). Thus, each datum also can be uniquely identified by the GUID 405 of the central data object 400, the name of the attribute (e.g., address, credit card number), and the unique business semantics name used to identify a particular datum of the attribute. For example, when the main billing address 425c of the central data object 400 is used as the "bill-to" address, the main billing address can be identified by the GUID 405 of the central data object, the "address" attribute, an the "bill-to" address usage, FIG. 5A shows an example of two client data objects 500 and 510. The client data objects 500 and 510 can be object in a computer system, such as, for example, in a client module 110 of a cMDM computer system, and can describe attributes of a customer with whom a business enterprise interacts in a particular way. The client data object 500 can be, for example, a "customer" data object in a customer relations management system. The customer data object 500 can describe, for example, attributes of a customer from whom a business sources parts and materials and can include a GUID 502, a customer name 504, and two addresses associated with the customer (e.g., a bill-to address 506 and a ship-to address 508). The client data object 510 can be, for example, a "dealer" data object in a customer relations management system. The dealer data object 510 can describe, for example, attributes of a dealer from whom a business sources parts and materials and can include a GUID 512, a dealer name 514, and three addresses associated with the customer (e.g., a correspondence address 516, a bill-to address 518, and a delivery address 520). The customer data object 500 and the dealer data object 510 can represent the same customer of an organization, but each client data object 500 and 510 might be stored separately in the client module 110 because they are used by different processes running on the client module 110. Other client data objects (not shown) representing the customer can also be stored in the client module 110 and can contain other information, including other addresses, that is not stored in the client data object 500 and 510.

Information concerning the client data objects 500 and 510 and the central data object 400 can be exchanged between the central module 100 and the client modules 110. To send a data object from a source module (e.g., central module 100) to a target module (e.g., client module 110), the data object's information can be converted into a source message in the source module, which is transmitted to the target agency, which receives the message as a target message that it converts into an object on that target agency. The source message and the target message are external representations of the data objects stored and used by source and target modules and generally have a different structure from the data structures of the data objects stored and used on the source and target modules. Messages generally include keys or pointers to other objects, so that the amount of data actually transmitted can be reduced. Thus, when a message is transmitted from a source agency to a target agency, a mapping between the source object and the target object can be used to coordinate the data transfer.

When transferring address information in a central data object 400, if the number or type of addresses 425a-425i stored in the central data object is not identical to the number and type of addresses stored in the customer data object 500 or the dealer data object 510, then the information in the central data object 400 and the client data objects 500 and 510 may not be directly transferable in a consistent manner between the data processing systems in which they are maintained and used. For example, if a central data object 400 is used by a central module 100 of a cMDM system, and a customer data object 500 is used by a client module 110 of the cMDM system, information may be lost or truncated during distribution of the central data object 400 from the central module to the client module 110. Additionally, even if the number of addresses 425a-425i stored in the central data object 400 is equal to the number of addresses stored in the client data object 500 or 510, if the validity or address-usage information is used on the central data object, data may be transferred inconsistently between the central data object 400 and the client data object 500 or 510.

Furthermore, information from multiple instances of different client data objects representing a customer (e.g., customer data object 500 and dealer data object 510) can be collected in the centrally stored central data object 400. Referring to FIG. 5B, for example, different client modules 110a, 110b, and 100c that communicate with the central module 100 within the cMDM system, may store different information relating to a customer. For example, a first client module 110a can maintain a customer data object 500 that stores a bill-to address and a ship-to address and a dealer data 510 object that stores a correspondence address, a bill-to address, and a delivery address. A second client module 110b can maintain a customer data object 520 that stores a ship-to address for a subsidiary company of the customer, a bill-to for a subsidiary of the customer, a warehouse ship-to address, and a warehouse bill-to address. A third client module 110c can maintain a customer object 530 that stores an incorporation address and a process service address.

To maintain the integrity of data and to transmit data in a consistent manner between central module 100 and client modules 110 during updates of data from the client modules 110a, 110b, and 110c to the central module 100, a key-mapping between information contained in the client data objects 500, 510, 520, and 530 and the central data object 400 can be maintained. For example, referring to TABLE 1, a key-mapping can be maintained in the central module 100 to track the relations between addresses maintained in the central data object 400 and addresses maintained in the client data objects 500, 510, 520, and 530. As shown in the first row of TABLE 1, a mapping between the central data object 400 and the four client data objects 500, 510, 520, and 530 is maintained. The second row of TABLE 1 indicates that the correspondence address has been chosen as the standard address for the central data object 400 and that the correspondence address stored in the central data object 400 is associated with the correspondence address of the client data object 510. The third row of TABLE 1 indicates that the ship-to address of the central data object 400 is associated with the ship-to address of the client data object 500 and with the delivery address of the client data object 510. The fourth row of TABLE 1 indicates that the bill-to address of the central data object 400 is associated with the bill-to address of the client data object 500 and the bill-to address of the client data object 510. Similarly, the remaining rows of TABLE 1 indicate that the subsidiary ship-to address of the central data object 400 is associated with the ship-to address of the client data object 520, that the subsidiary bill-to address of the central data object 400 is associated with the bill-to address of the client data object 520, that the warehouse ship-to address of the central data object 400 is associated with the warehouse ship-to address of the client data object 520, that the warehouse bill-to address of the central data object 400 is associated with the warehouse bill-to address of the client data object 520, that the incorporation address of the central data object 400 is associated with the incorporation address of the client data object 530, and that the process-serving address of the central data object 400 is associated with the process-serving address of the client data object 530.

TABLE 1

| BP(200) | DO(300); DO(310); DO(320); DO(330) |
| --- | --- |
| BP/Standard (correspondence) | DO(310)/correspondence |
| BP/ship-to | DO(300)/ship-to; DO(310)/delivery; |
| BP/bill-to | DO(300)/bill-to; DO(310)/bill-to; |
| BP/subsidiary ship-to | DO(320)/ship-to |
| BP/subsidiary bill-to | DO(320)/bill-to |
| BP/warehouse ship-to | DO(320)/warehouse ship-to |
| BP/warehouse bill-to | DO(320)/warehouse bill-to |
| BP/incorp. | DO(330)/incorp. |
| BP/process-serve | DO(330)/process-serve |

Figure 6A:
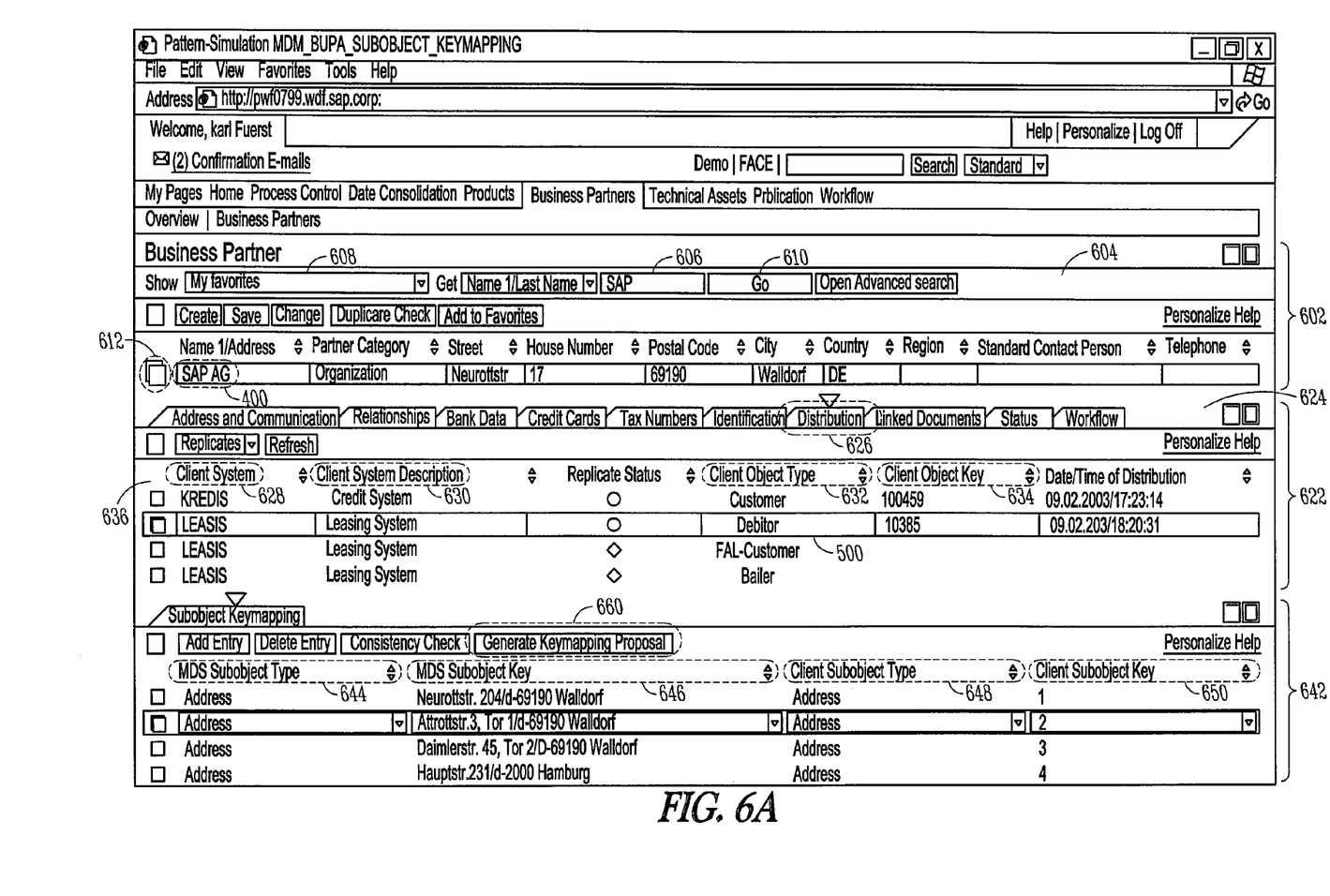
FIG. 6A and FIG. 6B are a screen shots of graphical user interfaces for creating mapping associations between central data objects client data objects.

Referring to FIG. 6A, a graphical user interface ("GUI") 600 can be used to create mapping associations between data (e.g., addresses) contained in the central data object 400 and used in the central module 100 and data contained in the client data objects 500, 510, 520, and 530 and used in the client modules 110. The GUI 600 includes a first sub-window 602 in which a central data object 400 can be selected. For example, the sub-window 602 can include a search bar 604 from which a central data object 400 can be located in a drop-down list of favorite central data object 606. The central data object 400 can also be retrieved by entering a search term in a window 606 and beginning a search for central data objects having a name 404 that matches the search term by selecting a search button 610. When several matching central data objects are returned as a result of the search, the desired central data object can be chosen by selecting a button 612 adjacent to the desired central data object 400.

The GUI 600 further includes a second sub-window 622 in which a client data object 300 can be selected. For example, the sub-window 622 can include a row of tabs 624 that can be selected to retrieve different client data objects. For example, by selecting the "Distribution" tab 626 a list of client data objects relating to distribution can be displayed. The list can include columns of information about the different client data objects, such as, for example, the name of the client system 628, a description of the client system 630, the data object-type 632, and the identification number of the client data object 634. One of the displayed client data objects 500 can be chosen, in order to create an association of its data with the data of the central data object 400 (as explained below). For example, a button in a column 636 adjacent to the name column 628 can be selected to select a particular client data object.

In a third sub-window 642 of the GUI 600, associations between data in the central data object 400 and the client data object 500 can be created. The sub-window 642 includes a column 644 in which a data-type (e.g., addresses, credit cards, tax numbers, etc.) of the selected central data object 400 can be selected for matching. In a neighboring column 646, data for individual instances of the selected data type is displayed. In the remaining two columns 648 and 650, the data-type of matching client data object 500 and the particular value of the data type of the matching client data object 500, respectively, can be selected. In the example shown in FIG. 4A, the address "Altrottstr. 3, Tor 1 /D-69190 Walldorf" stored in the central data object 400 on central module 100 is matched with the address number 2 stored in the client data object on the client module 110. Thus, when data with a central data object are transferred from the central module 100 to the client module 110, the particular address, "Altrottstr. 3, Tor 1 /D-69190 Walldorf," is associated with the second address (e.g., address number "2") in the client data object 500 on the client module 110. Messages transferred from central module 100 to client module 110 can include a key mapping such that the associations between the address "Altrottstr. 3, Tor 1 /D-69190 Walldorf" in central data object 400 and the second address number in the client data object 500 is maintained. In addition to manually generated mappings between the data from a central data object and the data from a client data object, automatically generated proposed mappings can be generated and displayed to the user, for example by selecting a button 652 to start a process for automatically generating the proposed mappings. The user can then either accept or modify the proposed mappings.

Figure 6B:
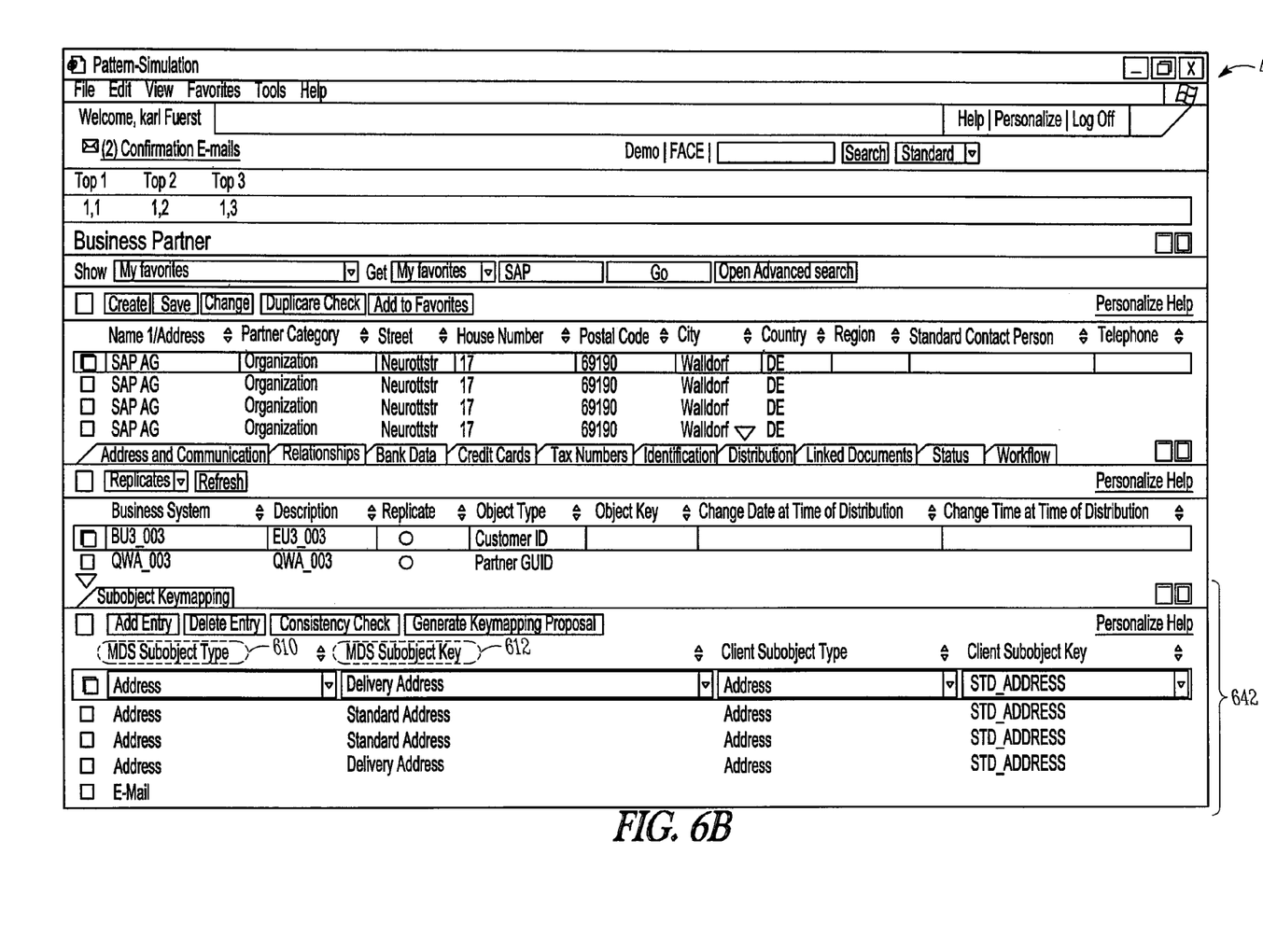

Referring to FIG. 6B, a GUI 660 can be used to create mapping associations between data from a central data object and data from a client data object using the business semantics associated with the data. In other words, rather than creating mappings between actual data stored in the central data object 400 and the client data objects 500 and 510, mappings can be created between data and meta data stored in with the central data object 400 and the client data objects 500 and 510. For example, as shown in FIG. 6B, after a central data object 400 has been selected in the second sub-window 622, a matching can be created between the address used as the "delivery address" in the central data object 400 and the standard address used in the client data object 500, as shown in the first row 664 of the third sub-window 642 of the GUI 660. By creating a mapping on the meta data level (i.e., using the business semantics associated with the data), the mapping between data in the central data object 400 and the data in the client data object 500 can be maintained even when the actual data associated with the meta data change. For example, if the address "Altrottstr. 3, Tor 1 /D-69190 Walldorf" is valid as the "delivery" on the central data object 400 for a first time period and "Neurottstr. 206 /D-69190 Walldorf" is valid as the "delivery" address for a second time period, a mapping between the "delivery" address on the central data object 400 and the standard address on the client data object will automatically remap "Neurottstr. 206 /D-69190 Walldorf" to the standard address on the client data object when the first time period expires and the second time period begins.

Figure 7:
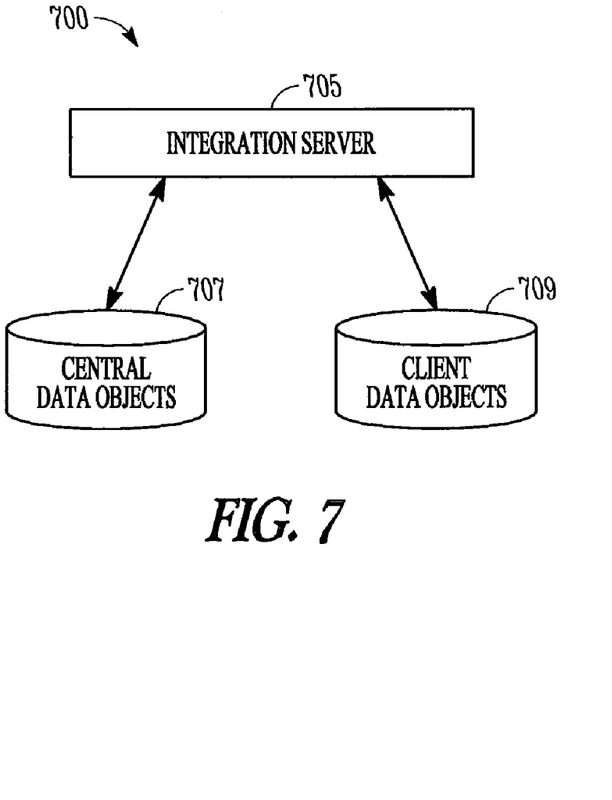
FIG. 7 is a block diagram of an example integration engine.

Referring to FIG. 7, an integration engine 700 manages the co-ordination of information stored in the different data models of the central data object 707 and the client data object 709, so that information from a source system can be processed appropriately by a target system. The client data object 709 can include, for example, the customer data object 500 that stores a bill-to address and a ship-to address, the dealer data 510 object that stores a correspondence address, a bill-to address, and a delivery address, the customer data object 520 that stores a ship-to address for a subsidiary company of the customer, a bill-to for a subsidiary of the customer, a warehouse ship-to address, and a warehouse bill-to address, and the customer object 530 that stores an incorporation address and a process service address. Each of these objects are discussed in detail with reference to FIG. 5B, above. As shown in FIG. 7, integration engine 700 can include an integration server 705 that results from the performance of machine-readable instructions by one or more data processing machines. Integration server 705 can support open and/or closed standards. For example, integration server 705 can support the Java 2 Enterprise Edition (J2EE) standard or the Advanced Business Application Programming (ABAP) language. Integration server 705 can access data from the central data object 700 and the client data objects 709 to map representations of information between different systems, and the mappings can be distributed to and stored on central module 100 or client module 110.

Figure 8:
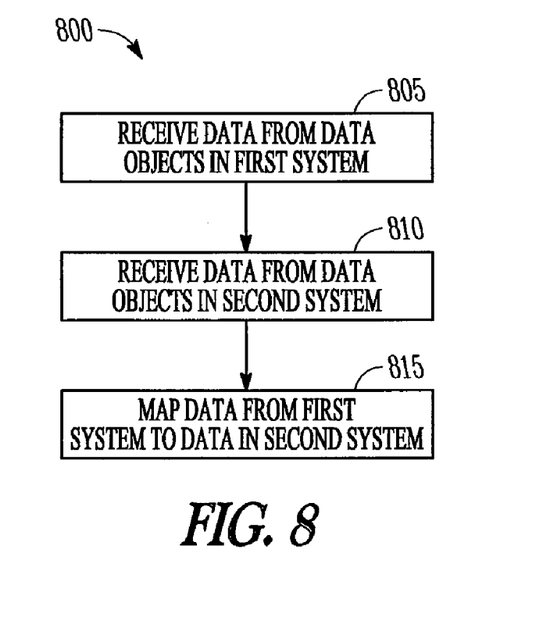
FIG. 8 is a flow chart of a process for mapping representations of information between different systems.

FIG. 8 is a flowchart of a process 800 in which an engine can manage different representations of information by mapping representations of information between different systems. An engine performing process 800 receives information describing particular data in a first data processing system (step 805) and particular data in a second data processing system (step 810). A user may select (e.g., through GUI 600 of GUI 660) the particular data from the first and second data processing systems to send to the engine. The engine then maps an association between the data from the data objects in the first and the second systems (step 815). The resulting mapping between the data from the data objects from the first and second systems can be machine-readable instructions for making an association between the data in a data object in the first system and data in a data object in the second system.

Figure 9:
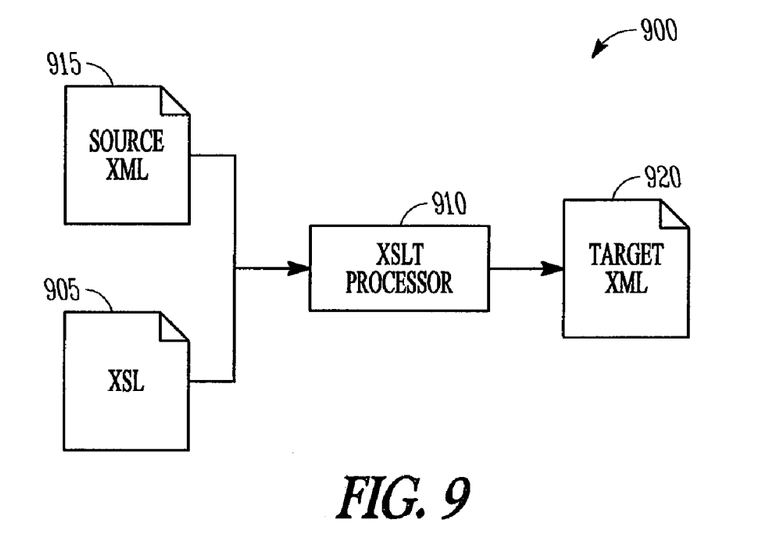
FIG. 9 shows an example of the use of a map to change a representation of data.

FIG. 9 shows a method 900 that uses a map of associations between data from different data processing systems settings 905 to coordinate the transfer of data between the systems. Map of data associations 905 can be machine-readable instructions for creating a result data object with one representation of data from a data object with another representation of data. For example, map of data associations 905 can provide one or more template rules used in creating a result data object. A template rule is a machine-readable definition of criteria for selecting portions of a source data structure and instructions for restructuring the selected portions to create a result data structure. A template can be instantiated for all or a portion of a source data structure to create all or a portion of a result data structure.

Map of data associations 905 can be stored as an extensible stylesheet language (XSL) file that describes, to an extensible stylesheet language-transformation (XSLT) processor 910, how to transform a representation of information in a source system to a different representation for use in a target system. XSLT processor 910 can be an application that associates the pattern of source XML document 915 with the pattern included in a template rule in an XSL map of customization settings 905 and instantiates the template in the template rule. The source system can represent information in a source XML document 915 and the target system can use the information in a target XML document 920 with a different representation.

Figure 10:
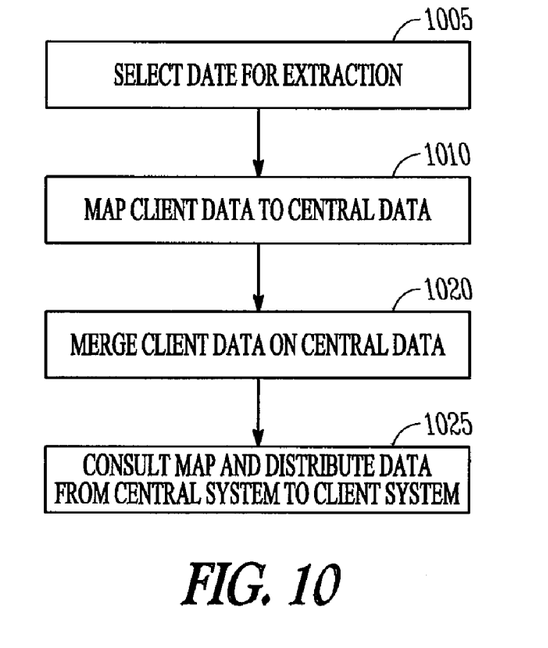
FIG. 10 is a flow chart of a process for distributing data from a central system to a client system based on a mapping between central data objects and client data objects.

FIG. 10 shows a method 1000 for loading data from data object stored on a first client system into a central data object stored on a central system, creating mappings between the data stored in the central data object and data stored in client data objects, and distributing data from the central data object to a client data object. A user can select client data to be extracted from one or more client data objects into central data objects (step 1005). The selected client data are matched with data in a one or more central data object and mapping is created between the data in the client data objects and the data in the central data objects (step 1010). The mapping information can be stored on either the central system, the client system, or on both systems (step 1015). The mapping between data in multiple client data objects and a central data object therefore can create a corresponding mapping between data in different client data objects. Data from multiple client data objects then is merged into one central data object (step 1020), and the central data object is posted to a central database on the central system.

When data is distributed from a central data object on stored on the central system to one or more client data objects on a client system, the mapping is consulted and the data are extracted from the central data object and distributed according to the mapping the client data object(s) (step 825).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method of sharing data, the method comprising:
storing a central data object in a central computer system, the central data object including an attribute and a plurality of values for the attribute;
creating a first mapping, using one or more processors, between the values of the attribute for the central data object stored in the central computer system and values of an attribute for a first client data object stored in a client computer system, the first mapping designating a correspondence between central metadata and client metadata, the central metadata referring to a first value of the attribute for the central data object, the central metadata indicating the first value is valid for the attribute for the central data object during a first time period, the central metadata referring to a second value of the attribute for the central data object, the central metadata indicating the second value is valid for the attribute for the central data object during a second time period not overlapping the first time period, and the client metadata referring to a value of the attribute for the first client data object;
storing the first mapping;
using the first mapping to selectively extract first data from the central data object for distribution to the first client data object; and
distributing the extracted first data from the central computer system to the client computer system.

2. The method of claim 1, wherein the first mapping further designates a direct correspondence between a value stored in the central data object and a value stored in the first client data object.

3. The method of claim 1, wherein the central metadata for the central data object are organized according to a business semantics used for organizing data in the central data object.

4. The method of claim 1, wherein a validity value determines the value stored in the central data object to which the central metadata refers.

5. The method of claim 1, wherein the attribute for the central data object is an address.

6. The method of claim 1, wherein creating the first mapping includes receiving a designation from a user input through a graphical user interface specifying a relationship between the values of the attribute for the central data object and the values of the attribute for the first client data object stored in the client computer system.

7. The method of claim 1, further comprising:
creating a second mapping between the values of the attribute for the central data object and values of an attribute for a second client data object stored in the client computer system;
storing the second mapping;
using the second mapping to selectively extract second data from the central data object for distribution to the second client data object; and
distributing the extracted second data from the central computer system to one or more client systems.

8. The method of claim 7, wherein the extracted first data and the extracted second data are distributed at substantially the same time.

9. The method of claim 7, wherein at least a portion of the first data is different from the second data.

10. A system to share data, the system comprising:
a central module of an entity to couple to one or more client computer systems, the central module comprising:
a central data store to store a central data object and a first mapping between values of an attribute for the central data object and values of an attribute for a first client data object stored in one of the client computer systems, the central data object to include the attribute and a plurality of values for the attribute, the first mapping designating a correspondence between central metadata and client metadata, the central metadata referring to a first value of the attribute for the central data object, the central metadata indicating the first value is valid for the attribute for the central data object during a first time period, the central metadata referring to a second value of the attribute for the central data object, the central metadata indicating the second value is valid for the attribute for the central data object during a second time period not overlapping the first time period, and the client metadata referring to a value of the attribute for the first client data object; and
a master data server to selectively extract first data from the central data object using the first mapping, the first data being configured to be distributed to the first client data object.

11. The system of claim 10, wherein the first mapping is further to designate a direct correspondence between a value stored in the central data object and a value stored in the first client data object.

12. The system of claim 10, wherein central metadata for the central data object are organized according to a business semantics used for organizing data in the central data object.

13. The system of claim 10, wherein a validity value is to determine the value stored in the central data object to which the central metadata refers.

14. The system of claim 10, wherein the attribute for the central data object is an address.

15. The system of claim 10, wherein the central data store is additionally adapted to store a second mapping between the values of the attribute stored in the central data object and values of an attribute for a second client data object stored in at least one of the one or more client computer systems and additionally to store the second mapping in the central computer system used to selectively extract second data from the central data object for distribution to the second client data object.

* * * * *